United States Patent Office 3,190,839
Patented June 22, 1965

3,190,839
PROCESS FOR PREPARING RANEY-NICKEL HYDROGENATION CATALYSTS OF SELECTIVE ACTIVITY
Ulrich Hauschild, Hannover, and Martin Stahl, Sonthofen, Allgau, Germany, assignors to Kali-Chemie Aktiengesellschaft, Hannover, Germany
No Drawing. Filed Oct. 3, 1961, Ser. No. 142,497
Claims priority, application Germany, Oct. 5, 1960, K 41,825
7 Claims. (Cl. 252—430)

This invention relates to a process for preparing selectively acting Raney-nickel hydrogenation catalysts and it has particular relation to catalysts of this type adapted to be used in the manufacture of hydrogen peroxide.

In the manufacture of $H_2O_2$ over autoxidizable organic compounds, such as anthraquinones, for the hydrogenation of the oxidized organic compounds specific catalysts are needed, which are usually metals in highly active form, for example finely distributed palladium or platinum on a carrier material or Raney-nickel.

The beforementioned catalysts are of such high activity that hydrogenation takes place already at ordinary room temperature and under atmospheric pressure. However, in addition to the hydrogenation of the quinones to the respective hydroquinones, hydrogenation in the nucleus always takes place to a varying extent and this hydrogenation has a disturbing effect, because it results in the formation of products which are slow to react or even inactive in the cyclic process.

In order to reduce to a minimum the formation of anthraquinone compounds which are hydrogenated in the nucleus, various suggestions have been made previously. These suggestions relate mainly to treatments for reducing the activity of the hydrogenating catalyst.

Thus, it has been suggested to treat nickel hydrogenation catalysts prior to their use with ammonium salts, whereby a reduction of the hydrogenation in the nucleus of anthraquinone compounds, e.g. tetrahydro - 2 - ethylanthrahydroquinone is attained. The preliminary treatment of other conventional hydrogenating catalysts, e.g. palladium on carrier materials, with organic nitrogen compounds, such as amines, nitrites, isocyanates, nitrogen-containing heterocyclic compounds, etc. has likewise been suggested previously. In addition, solvents or solvent mixtures for the anthraquinone compounds are used, which reduce the activity of the hydrogenating catalyst, for example chlorinated hydrocarbons. In spite of the activity-reducing effect of the substances hitherto suggested, the known methods are not satisfactory in the use of active Raney-nickel catalysts, because they do not result in a complete suppression of hydrogenation in the nucleus.

It has now been found that in the hydrogenation of quinones to hydroquinones in the presence of Raney-nickel hydrogenation catalysts, hydrogenation in the nucleus can be completely suppressed by treatment of the Raney-nickel hydrogenation catalysts prior to their use, with aldehydes. The aldehydes have a selective poisoning effect on the catalysts, as the catalytic transfer of hydrogen on the oxygen of the quinone is preserved, while—as mentioned above—no hydrogenation in the nucleus takes place.

A particularly suitable aldehyde is the formaldehyde which is preferably used in the form of an aqueous or alcoholic solution. However, other solvents may also be used. The use of an aqueous formaldehyde solution is preferred, because Raney-nickel is prepared in aqueous solution and, therefore, can be subjected immediately without any further manipulation to an after-treatment in order to reduce its activity. On the other hand, treatment of the Raney-nickel with formaldehyde can be very well carried out also in alcoholic medium, because it is conventional to carry out hydrogenation of organic substances in organic solvents and, therefore, the Raney-nickel ready for use is stored in organic liquids. Treatment of the Raney-nickel hydrogenating catalysts can be carried out, for example, by adding to a suspension of the catalyst a dilute aldehyde solution, stirring for some time at room temperature and washing subsequently with alcohol after decanting or sucking off. The use of specific temperatures is not necessary; in general, treatment at ordinary room temperature gives satisfactory results. It has been found to be of advantage to carry out the treatment in an inert gaseous atmosphere, e.g. in nitrogen.

The amount of aldehyde used for the treatment of a certain amount of catalyst and the period of treatment are interrelated. As far as possible, the concentration of the aldehyde in the solution should not be too high. In the case of formaldehyde solutions of 0.5 to 10% should be preferably used. In this case, the Raney-nickel hydrogenating catalyst is usually treated for 2 to 10 hours with a formaldehyde solution of 0.5–2.0%, the ratio between the amount of formaldehyde to that of the catalyst being in the range of 0.02:1 and 0.2:1. By using higher amounts of formaldehyde the duration of the treatment can be reduced, for example up to a few minutes. Thus, a wide range of variation is available, because formaldehyde solutions of higher concentration can also be used. In the case of other aldehydes, such as acetaldehyde or benzaldehyde, the situation is similar, although in the use of Raney-nickel treated with these aldehydes hydrogenation may start only after a certain period of time.

Example 1

7.5 grams of conventional Raney-nickel are added to 400 grams of a test solution consisting of 15 grams of 2-ethylanthraquinone dissolved in equal parts by volume of trimethylbenzol and octanol, in a one liter flask. The air is then removed from the flask and the solution is stirred under a constant hydrogen pressure of one atmosphere and the volume of the gas absorbed is measured. The velocity of the hydrogen absorption was 1250 ml. of hydrogen in 10 minutes. However, after the quantitative formation of 2-ethylanthrahydroquinone the absorption of hydrogen has not stopped, and a further hydrogenation in the anthraquinone nucleus took place, in which the solution absorbed 137 ml. of hydrogen in 10 minutes. Thus, the ratio of velocities in the formation of products hydrogenated in the nucleus and in the formation of 2-ethylanthrahydroquinone amounted to 1:9.1.

According to the process of the present invention, 10 grams of freshly prepared Raney-nickel were added to 100 ml. of 1.5% aqueous formaldehyde solution and stirred for 6 hours in a nitrogen atmosphere at ordinary room temperature. After decanting the solution, the catalyst was washed with methanol.

7.5 grams of the catalyst thus treated were added to 400 grams of the above mentioned test solution and the further treatment was carried out as described above. The absorption of hydrogen amounted to 410 ml. in 10 minutes. After the absorption of 1.424 liters of hydrogen, no further absorption of hydrogen could be observed. Hydrogenation of the 2-ethylanthraquinone in the nucleus has not taken place and hydrogen was transferred to the quinone oxygen only.

Example 2

10 grams of freshly prepared Raney-nickel were suspended in 100 ml. of 4.5% aqueous acetaldehyde solution and stirred under nitrogen for 8 hours. After decanting and washing with methanol, 7.5 grams of the catalyst were used for the determination of activity in the manner described in the above Example 1. The absorption of hydrogen started after a certain period of time. After the catalyst has attained its full activity, in 10 minutes 512 ml. of hydrogen were absorbed. Hydrogenation of the 2-ethylanthraquinone stopped completely after the absorption of 1.424 liters of hydrogen. Hydrogenation in the nucleus did not take place.

*Example 3*

15 g. of Raney-nickel produced in the usual manner were stirred for 8 hours with 150 ml. of a 2-molar solution of benzaldehyde in ethanol under nitrogen at a temperature of 20° C. After washing with ethanol 7.5 g. of treated catalyst were taken away for the activity-test and examined together with the test-solution mentioned in Example 1. The catalyst began only gradually to transfer the hydrogen and after 15 minutes had an activity of 160 ml. hydrogen per 10 minutes. An equal volume of fresh test-solution was substituted under nitrogen for the hydrogenated test-solution. Just at the beginning of the second test the full hydrogenation-activity of the catalyst set in and was measured with 500 ml. hydrogen per 10 minutes. A hydrogenation of the nucleus could not be observed.

It will be understood from the above that this invention is not limited to the aldehydes, solvents, concentrations and other conditions and steps specifically described above and can be carried out with various modifications. Thus, instead of the aldehydes mentioned above, in carrying out this invention in a substantially similar manner, other aldehydes (or their mixtures) can be used, as examples of which the following are mentioned: propionaldehyde ($C_2H_5CHO$), n-butyraldehyde ($C_3H_7CHO$), n-valeraldehyde ($C_4H_9CHO$), n-caproic aldehyde ($C_5H_{11}CHO$)

benzaldehyde ($C_6H_5CHO$) and its homologs. In carrying out the invention, the aldehydes are used in solution, e.g. dissolved in water, a lower alcohol, acetone and the like. Mixtures of solvents can also be used. The treatment with the aldehyde solution is preferably carried out at ordinary room temperature (15–25° C.) but other temperatures in the range between 0° and 150° C. can also be used. As already mentioned above, by the use of increased amounts of aldehyde the duration of the treatment can be reduced. In using a Raney-nickel catalyst treated according to the invention with acetaldehyde or benzaldehyde, hydrogenation starts after about 1 to 60 minutes. This and other modifications can be made without departing from the scope of the invention as defined in the appended claims. The parts and percent are by weight if not otherwise stated.

What is claimed is:
1. A process for the preparation of selectively active Raney-nickel hydrogenation catalysts for preparation of $H_2O_2$ over an anthraquinone compound without hydrogenation in the nucleus of said anthraquinone compound, comprising treatment, prior to the hydrogenation, of a conventional Raney-nickel hydrogenation catalyst with an aldehyde of the formula

R—CHO wherein R is selected from the group consisting of H, alkyl radicals having 1 to 5 C-atoms and aryl radicals, said treatment with the aldehyde being carried out in a solvent selected from the group consisting of water and a lower alcohol.

2. A process as claimed in claim 1, in which the aldehyde solution is decanted after treatment and the catalyst is washed with an alcohol selected from the group consisting of methylalcohol and ethylalcohol.

3. A process as claimed in claim 1, in which said treatment is carried out in an inert gas atmosphere.

4. A process as claimed in claim 1, in which an aqueous formaldehyde solution is used.

5. A process as claimed in claim 1, in which an aqueous acetaldehyde solution is used.

6. A process as claimed in claim 1, in which an alcoholic benzaldehyde solution is used.

7. A process as claimed in claim 1, in which a formaldehyde solution containing 0.5–10% of formaldehyde is used.

References Cited by the Examiner

UNITED STATES PATENTS

| | | | |
|---|---|---|---|
| 2,276,192 | 3/42 | Hanford et al. | 260—638 |
| 2,497,889 | 2/50 | Hull | 252—431 |
| 2,720,531 | 10/55 | Umhoefer | 252—472 |
| 2,720,532 | 10/55 | Umhoefer | 252—472 |
| 2,730,533 | 1/56 | Umhoefer | 252—472 |
| 2,756,243 | 7/56 | Umhoefer | 252—472 |
| 2,760,994 | 8/56 | Gwynn | 252—472 |
| 2,775,621 | 12/56 | MacLean et al. | 260—635 |

TOBIAS E. LEVOW, *Primary Examiner.*